US007200651B1

(12) United States Patent
Niemi

(10) Patent No.: US 7,200,651 B1
(45) Date of Patent: Apr. 3, 2007

(54) DYNAMIC CONFIGURATION AND UP-DATING OF INTEGRATED DISTRIBUTED APPLICATIONS

(75) Inventor: Frederick E. Niemi, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/346,789

(22) Filed: Jul. 2, 1999

(51) Int. Cl.
G06F 15/173 (2006.01)
G06F 9/00 (2006.01)
G06F 3/00 (2006.01)

(52) U.S. Cl. ............... 709/223; 718/100; 719/318; 719/313; 715/735; 715/736

(58) Field of Classification Search ........ 709/200–252; 715/735, 736; 719/313, 318; 718/100
See application file for complete search history.

(56) References Cited

U.S. PATENT DOCUMENTS

| 4,462,077 | A |   | 7/1984  | York             |         |
|-----------|---|---|---------|------------------|---------|
| 4,849,879 | A |   | 7/1989  | Chinnaswamy et al. |       |
| 4,985,894 | A |   | 1/1991  | Suga             |         |
| 5,251,152 | A |   | 10/1993 | Notess           |         |
| 5,276,789 | A | * | 1/1994  | Besaw et al. ........... | 345/440 |
| 5,379,406 | A |   | 1/1995  | Wade             |         |
| 5,446,680 | A |   | 8/1995  | Sekiya et al.    |         |
| 5,504,863 | A |   | 4/1996  | Yoshida          |         |
| 5,553,235 | A |   | 9/1996  | Chen et al.      |         |
| 5,612,898 | A |   | 3/1997  | Huckins          |         |
| 5,642,478 | A |   | 6/1997  | Chen et al.      |         |
| 5,650,940 | A | * | 7/1997  | Tonozuka et al. ........ | 709/224 |
| 5,655,081 | A | * | 8/1997  | Bonnell et al. ......... | 709/202 |
| 5,664,093 | A |   | 9/1997  | Barnett et al. ....... | 395/183.07 |
| 5,675,798 | A | * | 10/1997 | Chang ................. | 709/224 |
| 5,715,432 | A |   | 2/1998  | Xu et al.        |         |
| 5,748,881 | A |   | 5/1998  | Lewis            |         |
| 5,764,913 | A | * | 6/1998  | Jancke et al. .......... | 709/224 |
| 5,793,366 | A | * | 8/1998  | Mano et al. ........... | 715/839 |
| 5,802,291 | A |   | 9/1998  | Balick et al.    |         |
| 5,958,004 | A |   | 9/1999  | Helland et al.   |         |
| 5,987,477 | A |   | 11/1999 | Schmuck et al.   |         |
| 6,021,438 | A | * | 2/2000  | Duvvoori et al. ....... | 709/224 |

(Continued)

OTHER PUBLICATIONS

Joyce, Jeffrey et al. "Monitoring Distributed Systems". ACM. May 1987.*

(Continued)

Primary Examiner—Lewis A. Bullock, Jr.
(74) Attorney, Agent, or Firm—Cesari and McKenna LLP

(57) ABSTRACT

An interactive reporting and modifying system and method for notifying clients of changes within a computer network, while allowing the clients to dynamically alter selected configuration, control, diagnostic, status and other network parameters. Applications and processes within the computer network first register with a process manager. A persistent, continuous connection allows a client to receive and display notifications from the process manager following the registration of new applications and processes. A topology server similarly notifies the client of the addition or removal of new devices. Thereafter, the client may request a configuration, control, diagnostic or debug object from a selected application or process or device. The requested object or a representation thereof is displayed and may be manipulated by the client, thereby modifying its variables. These modifications are then dynamically implemented at the respective application or process or device.

50 Claims, 7 Drawing Sheets

U.S. PATENT DOCUMENTS

| | | | | |
|---|---|---|---|---|
| 6,070,190 | A * | 5/2000 | Reps et al. | 709/224 |
| 6,085,224 | A * | 7/2000 | Wagner | 709/203 |
| 6,122,664 | A * | 9/2000 | Boukobza et al. | 709/224 |
| 6,185,611 | B1 * | 2/2001 | Waldo et al. | 709/221 |
| 6,212,581 | B1 * | 4/2001 | Graf | 710/18 |
| 6,253,228 | B1 * | 6/2001 | Ferris et al. | 709/203 |
| 6,260,062 | B1 | 7/2001 | Davis et al. | |
| 6,263,255 | B1 | 7/2001 | Tan et al. | |
| 6,289,368 | B1 * | 9/2001 | Dentler et al. | 718/101 |
| 6,356,282 | B2 * | 3/2002 | Roytman et al. | 345/736 |
| 6,360,260 | B1 * | 3/2002 | Compliment et al. | 709/224 |
| 6,360,338 | B1 * | 3/2002 | Johnson et al. | 714/49 |
| 6,404,743 | B1 * | 6/2002 | Meandzija | 370/254 |
| 6,470,388 | B1 | 10/2002 | Niemi et al. | |
| 6,473,797 | B1 * | 10/2002 | Hirasawa | 709/224 |
| 6,571,389 | B1 * | 5/2003 | Spyker et al. | 717/176 |
| 6,615,201 | B1 * | 9/2003 | Seshadri et al. | 707/2 |
| 6,769,125 | B2 * | 7/2004 | Menges et al. | 719/317 |
| 6,947,967 | B2 * | 9/2005 | Ferris et al. | 709/203 |

OTHER PUBLICATIONS

Goose, Stuart et al. "Unifying Distributed Processing and Open Hypermedia through a Heterogeneous Communication Model." University of Soghampton, Technical Report No. 95-6. Nov. 1995.*
Husain, Kamran et al. "Red Hat Linux Unleashed." Chapter 40, Processes. Sams Publishing, Jun. 1996.*
IBM. "TME 10 NetFinity Manager User's Guide". Jun. 1996.*
Olin, Peter. "Process Manager Application (PMAN) version 2.3". Nov. 6, 1997.*
INTERNET. "qps—Visual Process Manager".*
CISCO. "Using Process Manager". Sep. 1999.*
Griffith, Natalie. "The Process Manager GUI for CLEO III".*
Sun Microsystems. "Jini Discovery and Join Specification." Jan. 25, 1999.*
Schade, A. et al. "Object Instrumentation for Distributed Applications Management." Chapmann & Hall, London 1996.*
Shade, Andreas and peter Trommler. "A CORBA-Based Model for Distributed Applications Management." Proceedings of DSOM'96, IFIP/IEEE Seventh International Workshop on Distributed Systems: Operations & Management. Oct. 1996.*
Krause, Jason. "What the heck is . . . Jini?." CNN. Jul. 31, 1998.*
Sun Microsystems. "Jini Archtecture Specification." Revision 1.0. Jan. 25, 1999.*
Aschemann, Gerg et al. "A Framework for the Integration of Legacy Devices into a Jini Management Federation." DSOM'99.*
Fulton, Roger et al. "Simplifying the Development of Network Management Systems in a Distributed Environment." IEEE. 1998.*
Sun Microsystems. "Jini Discovery and Join Specification." Revision 1.0. Jan. 25, 1999.*
Waldo, Jim. "The JINI Architecture for network-centric computing." Communications of the ACM. Jul. 1999.*
NetView Console Java Client Overview, Copyright © 1999.
N. J. Muller, *Intelligent Hubs,* pp. 73-114, Copyright 1993.
Tivoli TME 10 NetView for OS/390 User's Guide, Chapter 12. Managing NetView Data, (c)1997, 1998 by Tivoli Systems Inc., pp. 1-6.
NetView MultiSystem Manager MVS/ESA, IBM Corp., (c) 1996, pp. 1-5.
Tivoli Distributed Monitoring Datasheet, Tivoli Systems Inc., (c) 1999, pp. 1-4.
Tivoli Enterprise Overview, Tivoli Systems Inc., (c) 1999, pp. 1-6.
J. Baher, IBM's NetVIEW/6000 challenges the best, PC Magazine, vol. 12, No. 20, Nov. 23, 1993, pp. 1-3.
E. Birkhead, NetView/6000 slingshots ahead, LAN Computing, vol. 4, No. 10 ,Oct. 1993, pp. 1-3.
Smith, C. et al., HP OpenView Windows: A User Interface for Network Management Solutions, Hewlett Packard Journal, Apr. 1990, pp. 60-65.
Herman, J. and Forbath, T., Riding the Internet Wave, HP NetMetrix empowers IT to measure and report in the networked environment for accountability to the business and end users, May 1997, pp. 1-16.
Ptak, R. and Noel, J., Moving from Reactive to Guaranteed Network Services, Jun. 1998, pp. 1-12.
Vinoski, S., CORBA: Integrating Diverse Applications Within Distributed Heterogeneous Environments, IEEE, (c) 1996, pp. 1-12.
Logging Messages with the Syslog Service, Cisco Systems, Inc., Dec. 18, 1997, pp. 1-4.
System Error Log and Event Log, Cisco Systems, Inc., Jul. 16, 1998, pp. 1-12.
Performance Management, Cisco Systems, Inc., Dec. 18, 1997, pp. 1-45.
Fault Management, Cisco Systems, Inc., Dec. 20, 1997, pp. 1-55.
Logging and Tracing, Cisco Systems, Inc., Dec. 20, 1997, pp. 1-4.
SV+Error Log Administration and Event Log, Cisco Systems, Inc., Dec. 19, 1997, pp. 1-7.

* cited by examiner

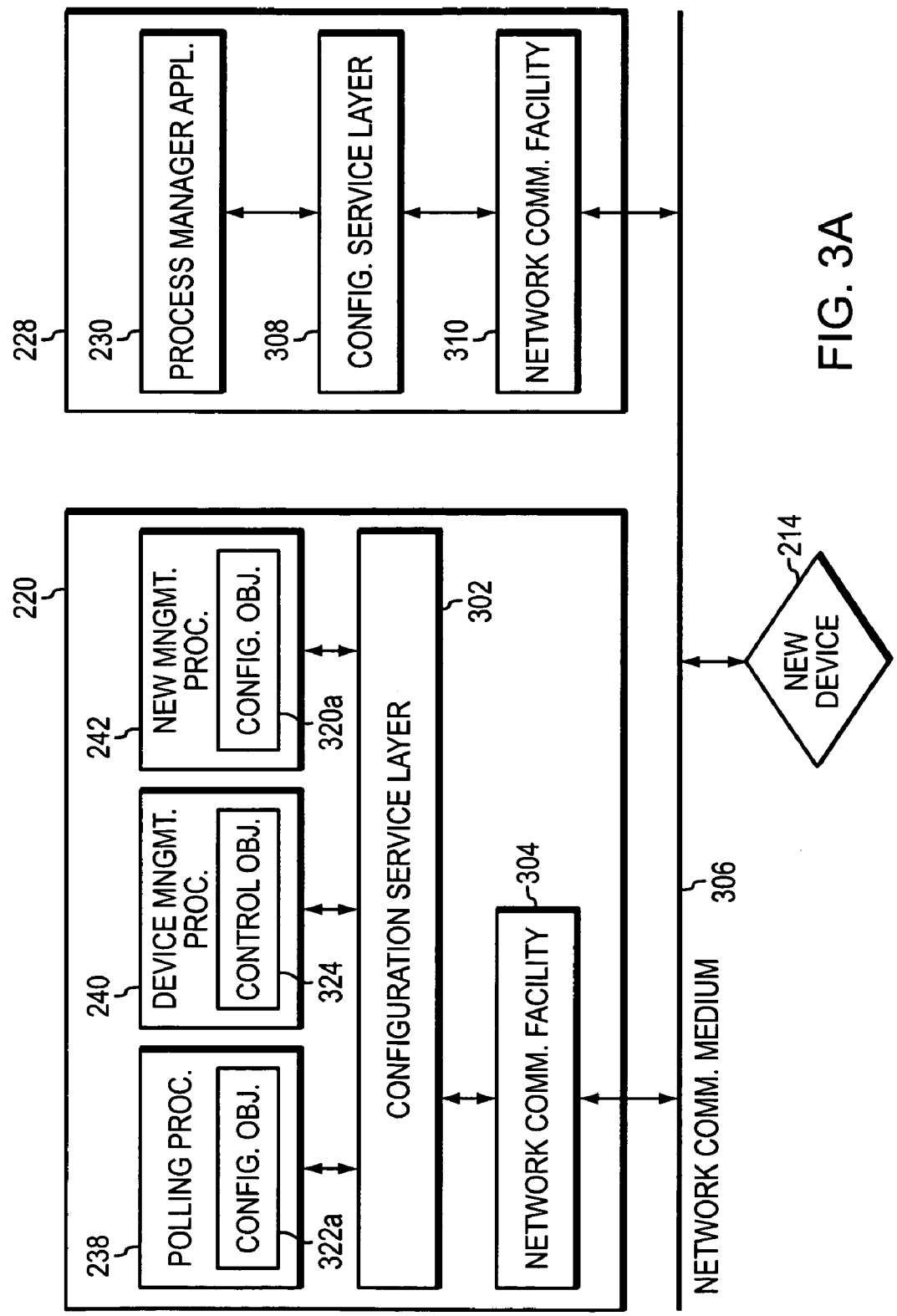

DYNAMIC CONFIGURATION AND UP-DATING OF INTEGRATED DISTRIBUTED APPLICATIONS

FIELD OF THE INVENTION

The present invention is related to computer networks, and more specifically, to a system and method for managing and controlling applications and processes that are distributed across a computer network.

BACKGROUND OF THE INVENTION

Organizations, including businesses, governments and educational institutions, increasingly rely on computer networks to share and exchange information. A computer network typically comprises a plurality of interconnected entities. An entity may consist of any device, such as a host or server, that sources (i.e., transmits) and/or receives messages. A common type of computer network is a local area network ("LAN") which typically refers to a privately owned network within a single building or campus. In many instances, several LANs may be interconnected by point-to-point links, microwave transceivers, satellite hook-ups, etc. to form a wide area network ("WAN") or intranet that may span an entire city, country or continent. An organization employing multiple intranets, moreover, may interconnect them through the Internet. Remote users may also utilize the Internet to contact and exchange information with the organization's intranet.

One or more intermediate network devices are often used to couple LANs together and allow the corresponding entities to exchange information. For example, a bridge may be used to provide a "bridging" function between two or more LANs or a switch may be utilized to provide a "switching" function for transferring information between a plurality of LANS. A router is often used to interconnect LANs executing different LAN standards, to interconnect two or more intranets and/or to provide connectivity to the Internet. Routers typically provide higher level functionality than bridges or switches.

In many computer networks, applications or processes are distributed across numerous workstations and servers. For example, due to the complexity of many computer networks, network management applications have been developed to assist administrators in the configuration of their networks. These network management applications also facilitate the identification and correction of faults, and assist administrators in maintaining a high level of network performance. Examples of network management applications include HP OpenView® from Hewlett-Packard Co. of Palo Alto, Calif. and NetView 6000 from International Business Machines Corp. of Armonk, N.Y., each of which provide a suite of applications and processes for collecting, storing and displaying network information. These network management applications are typically distributed across several workstations or servers within the network, in part, because their processor and memory requirements often exceed the capabilities of a single workstation or server. Each instance of these applications, moreover, may be responsible for a different area or region of the respective computer network.

FIG. 1 is a highly schematic representation of a network management application distributed across multiple entities of a computer network 100. The network 100 includes a plurality of network devices 102–110, which may be bridges, switches, routers, servers, hosts, etc. As described below, new devices, such as new device 112 may be subsequently added to the network 100. The network 100 further includes a series of workstations 114–128 at which instances of the network management application are running. In particular, workstation 114 may be running two instances of a polling process 130, 132 that have been configured to poll devices 102 and 104, and device 106, respectively. A polling process polls devices in order to obtain a particular set of information. Workstation 116 may be running an event receiver process 134 that is configured to trap or receive events generated by device 108. Workstation 118 may be running another polling process 136 which has been configured to poll device 110. As described below, a new network management process 138 may subsequently be initialized at workstation 118.

The distributed network management application may further include two instances of an intermediary data collection process 140, 142 running at workstations 120, 122, respectively. Intermediate data collection processes 140, 142 are configured to collect the information acquired by multiple processes, such as processes 130–138 running at workstations 114–118. The distributed network management application also includes applications for presenting data acquired from the network 100 to network administrators.

More specifically, running at each workstation 124–128 is an instance of a user interface application 144–148, respectively. The user interface applications 144–148 receive information from the intermediary data collection processes 140 and 142 and display it, typically through a dedicated, windows-based Graphical User Interface (GUI) (not shown), to a network administrator. Each user interface application 144–148 typically reads a corresponding configuration file 150–154, respectively, upon start-up or opening at the respective workstation 124–128. The configuration files 150–154, among other things, identify the particular intermediary data collection applications 140, 142, network management processes (e.g., pollers, event receives, etc.) and devices 102–112 from which the respective user interface applications 144–148 are to receive information, and may direct applications to open corresponding windows.

When a new device or new type of device, such as new device 112 is added to the network 100, the settings at one or more of the network management application processes, such as polling process 136, must be up-dated to incorporate the new device 112. In order to change the settings at polling process 136, it must typically be shut-down, new software must be loaded and the polling process 136 re-started. In addition, in order to make the polling information acquired from the new device 112 available to one or more user interface applications, such as application 148, the identity of this new device 112 must be added to the corresponding configuration file 154. Simply adding new device 112 to configuration file 154 does not, however, make user interface application 148 aware of that device 112, since application 148 only reads its configuration file 154 at start-up. Accordingly, user interface application 148 must be shut-down, new software loaded and then re-started in order for it to "learn" of the existence of the new device 112, and generate a corresponding window. Similarly, if a new management process, such as new process 138, is added to the distributed network management application, one or more of the configuration files 150–154 must be up-dated with information regarding this new process 138. As described above, the corresponding user interface application 144–148 must also be shut-down, up-dated and re-started in order for it to learn of the existence of the new process 138.

This closing, installation of new software and then restarting of various instances of network management and other distributed applications following every change in configuration or settings is time-consuming, error prone and annoying to most administrators. In addition, during the time that the respective application or process is shut-down, the network or the relevant region thereof is not being managed. As a result, errors or faults that occur while the application or process is closed may go un-detected, causing even greater network problems. Computer networks, moreover, are constantly being changed and up-dated with the addition and removal of LANs, network devices, links, etc, in addition to the running of new software applications and the up-dating of current software applications. Only by closing, up-dating and re-starting the relevant applications and/or processes can these changes be accommodated by the network.

It is an object of the present invention to provide a system and method for automatically reporting changes to a computer network. It is another object of the present invention to provide a system and method for dynamically up-dating or modifying configuration or other files.

It is a further object of the present invention to provide a system and method for dynamically modifying the settings of applications and processes.

It is a still further object of the invention to provide a system and method for changing or modifying the settings of network devices.

SUMMARY OF THE INVENTION

Briefly, the present invention is directed to a system and method for dynamically modifying the configuration, settings and other parameters of distributed applications running in a computer network without disrupting the operation of the network. The system embodies an interactive reporting and modifying technique that automatically notifies clients of changes to the network, while also allowing the clients to dynamically alter selected network parameters. According to the invention, clients, such as network administrators, may be automatically notified of changes to the network, and, in response, may interact with newly opened applications or processes and newly added devices without having to be closed and re-started. More specifically, applications and processes, upon opening or initialization, register with a process manager. In response, the process manager is configured to generate a first notification object containing a reference identifying the new application or process, and to pass it to one or more client user interface applications. The user interface application includes one or more interactive windows configured to dynamically run and display the notification object, thereby notifying the network administrators of the existence and identity of the new application or process. For the discovery of new devices, the network further includes a topology server, which runs a discovery application for detecting the addition of new devices. The topology server is similarly configured to generate and pass a second notification object to one or more user interface applications. The user interface application dynamically runs and displays the notification object in one or more windows, thereby alerting the network administrator of the existence of the new devices.

In a further aspect of the invention, network administrators may interact with the displayed notification objects to retrieve additional interactive objects for display so as to modify selected parameters of applications, processes or devices within the computer network. In particular, after learning of the existence of a new application, process or device, the network manager may issue a first service request, through his or her user interface application, to modify the configuration, diagnostic, debug, control or other parameters of a selected network component. In response, the network component, or the process assigned to control that component, constructs a corresponding configuration, diagnostic, debug or control object from a previously defined base "configuration" object class. The network component then passes this object or a reference thereto to the user interface application, which includes one or more windows configured to dynamically run and display the object or the reference thereto. The network administrator may then interact with the displayed object or the reference to change the object's parameters. In response to such manipulation, the object communicates these changes directly to its respective network component, which, in turn, is configured to implement these changes without having to be shut-down and re-started.

BRIEF DESCRIPTION OF THE DRAWINGS

The invention description below refers to the accompanying drawings, of which:

FIGS. 3A and 3B are highly schematic, functional diagrams of a plurality of network components in accordance with the present invention.

DETAILED DESCRIPTION OF AN ILLUSTRATIVE EMBODIMENT

Figure 1:
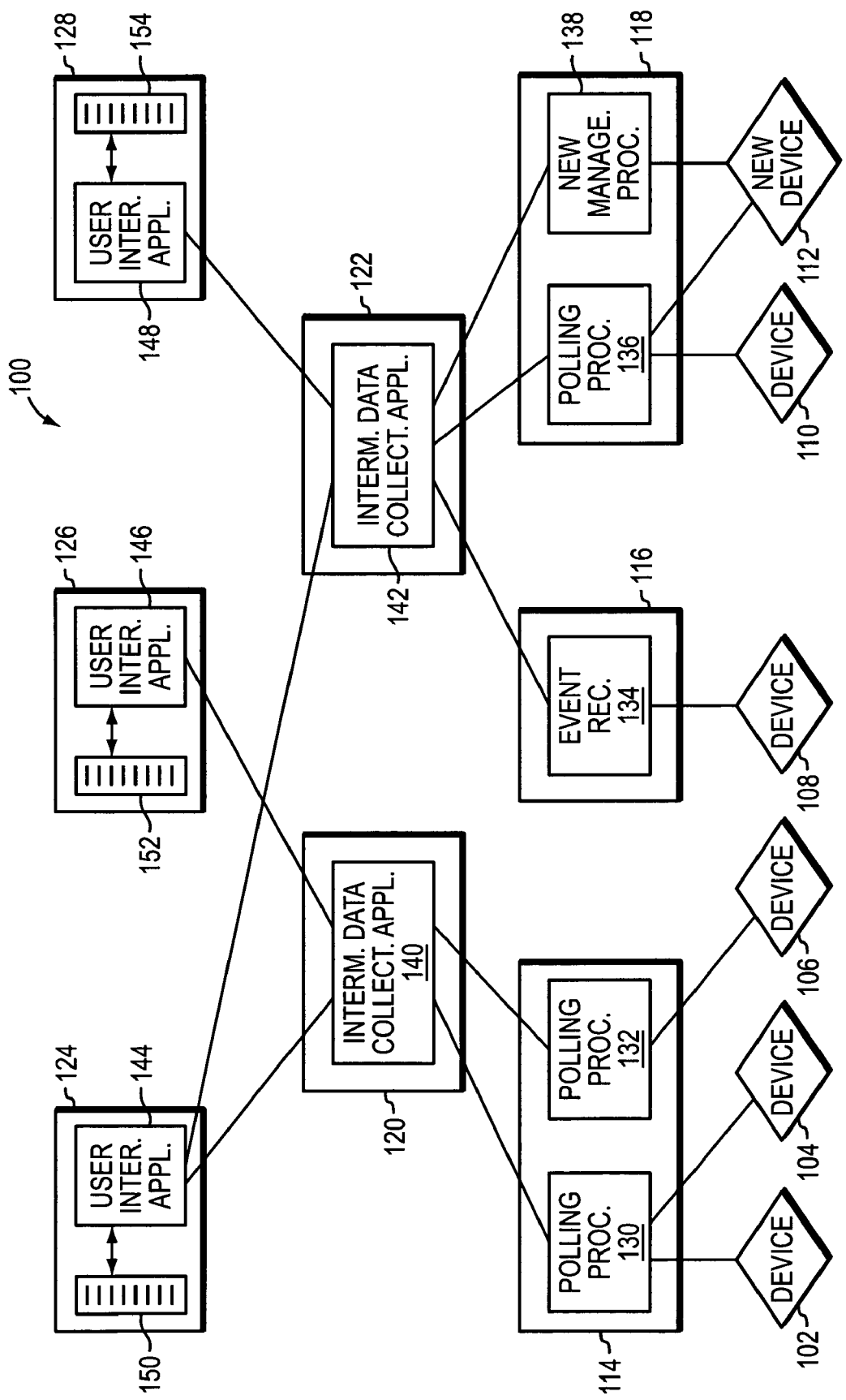
FIG. 1, previously discussed, is a highly block schematic diagram of a conventional computer network implementation of a distributed application.
Figure 2:
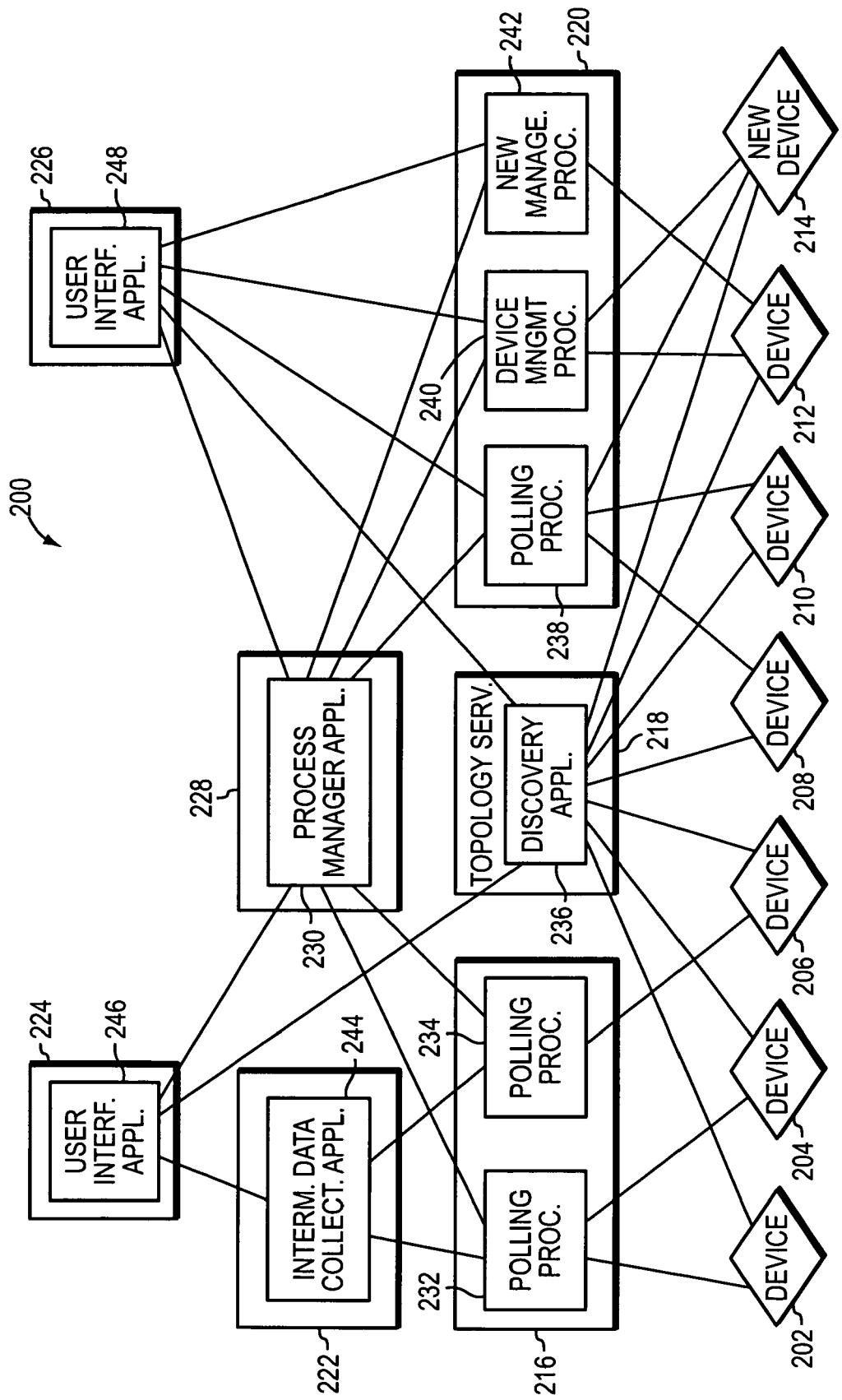
FIG. 2 is a highly schematic block diagram of a computer network in accordance with the present invention.

FIG. 2 is a highly schematic block diagram of a computer network 200 in accordance with the present invention. Network 200 preferably includes a plurality of network components, such as network devices, applications, processes, etc. In particular, network 200 includes network devices 202–212, which may be bridges, switches, routers, servers, hosts, etc. As described below, new devices, such as new device 214 may be subsequently added to the network 200. The network 200 further includes a plurality of workstations 216–226 at which instances of a distributed application or process are running. The network 200 may also include a workstation 228 running an instance of a process manager application 230, which will be described in more detail below. The distributed application running at workstations 216–226 may be a network management application, such as HP OpenView from Hewlett-Packard or NetView 6000 from IBM. For example, workstation 216 may be running two instances of a polling process 232, 234 that are configured to poll devices 202 and 204, and device 206, respectively. Workstation 218 may be configured as a topology server. That is, workstation 218 may be running a discovery application 236 that detects the presence of devices, links, etc. within the network 200. Workstation 220 may be running a polling process 238 that is configured to poll devices 208 and 210, and a device management process 240 that is configured to manage device 212. As described below, a new network management process 242 may subsequently be initialized at workstation 220.

The distributed network management application may further include an instance of an intermediary data collection process 244 running at workstation 222. It also includes applications for presenting data acquired from the network 200 to network administrators. More specifically, running at each workstation 224, 226 is an instance of a user interface application 246, 248, respectively. The user interface applications 246, 248 receive information from intermediary data collection process 244 and/or directly from polling process 238 and device management process 240, and display it, as described in greater detail below, to network administrators through corresponding, windows-based, interactive Graphical User Interfaces (GUI). Depending on its complexity, there may be tens of user interface applications running throughout the network 200. Each help desk operator, for example, may be running a copy.

It should be understood that network 200 is meant for illustrative purposes only and that the present invention will operate with other, often far more complex, network designs. Network 200 may also be running, and the present invention may inter-operate with, other distributed applications, such as an inventory or order control application from SAP AG of Walldorf, Germany or a customer service application from People-Soft, Inc. of Pleasanton, Calif.

User interface application 246, moreover, may be configured to present one or more system administration display windows, while user interface application 248 may be configured to present one or more system event display windows. From the system administration display windows at workstation 224, a network administrator reviews information regarding the various instances of distributed applications and processes, including, for example, application 244, and processes 232, 234, 238 and 240. With the prior art systems, in order to obtain information for a new application, process or device that is added to the network 200, user interface application 246 would have to be closed, new software installed and its configuration files manually updated. The user interface application 246 would then have to be re-started, causing it to read its up-dated configuration file and display information regarding the new application or process or device in its system administration display windows.

As described herein, with the present invention, the addition of new applications, processes or devices to computer network 200 is automatically reported to user interface applications 246, 248 without having to close and re-start those applications. In addition, network administrators may call-up and alter or modify the configuration, diagnostic, de-bug, control or other parameters of these new applications, processes or devices, and those modifications will be dynamically implemented by the respective network components without having to shut-down and re-start them.

Figure 3B:
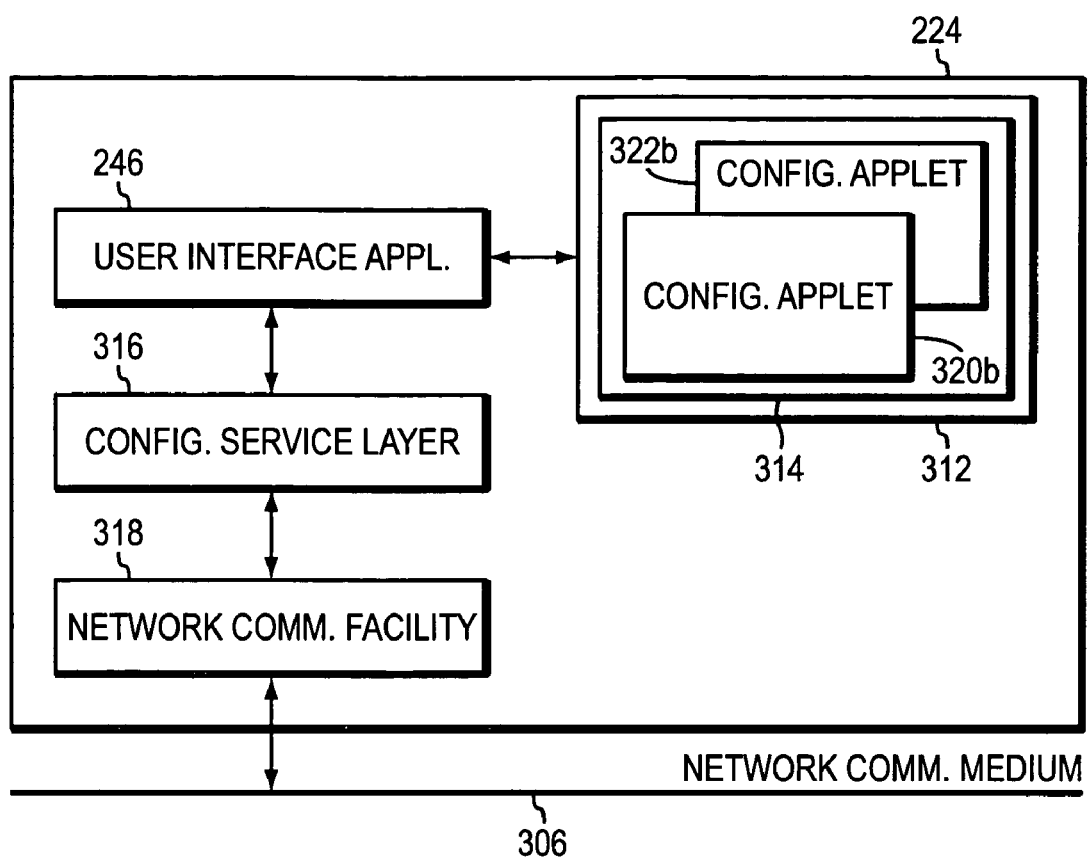

FIGS. 3A and 3B are highly schematic, functional diagrams of workstations 220, 228 and 224, and new device 214 of network 200. At workstation 220, polling process 238 and device management process 240 are running. As described below, a new management process 242 may be installed and opened at workstation 220. Also running at workstation 220 is a configuration service layer 302 that is in communicating relationship with processes 238 and 240. The configuration service layer 302 is also in communicating relationship with a conventional network communication facility 304 that provides connectivity to the computer network 200 (FIG. 2). In particular, the network communication facility 304 is coupled to a network communication medium 306, which may represent a Local Area Network (LAN) or other internetwork communication media. At workstation 228, process manager application 230 is running. Application 230 is also in communicating relationship with a configuration service layer 308 operating at workstation 228. In addition, a network communication facility 310 provides workstation 228 and the applications and processes executing thereon, including service layer 308, with connectivity to the network 200 via network communication medium 306.

At workstation 224 (FIG. 3B), the user interface application 246 is running. Workstation 224 also includes a display device 312 having a screen 314. User interface application 246 is operably coupled to the display device 312 for presenting windows and images, as described below. User interface application 246 is also in communicating relationship with a configuration service layer 316 operating at workstation 224. Configuration service layer 316, in turn, is coupled to a network communication facility 318 that provides connectivity to network 200 via network communication medium 306. In the illustrated embodiment, the network communication facilities 304, 310 and 318 include conventional hardware and software components to support network communication in accordance with a communications architecture, such as the Transmission Control Protocol/Internet Protocol (TCP/IP) Reference Model.

For purposes of explanation, a single configuration service layer is illustrated at each workstation. However, in the preferred embodiment, each application or process, such as polling process 238, device management process 240 and new management process 242, is linked to or otherwise includes its own configuration service layer. Processes and applications 238, 240, 242, 230 and 246, moreover, preferably communicate with their respective configuration service layers 302, 308 and 316 through a plurality of application programming interface (API) system calls or commands and cooperate to issue and act upon various service requests. These API calls and service requests, which are described in more detail below, are generally issued together with one or more arguments and may be returned by the configuration service layers 302, 308 and 316 also with one or more arguments. The present invention includes the following API system calls or service requests (the arguments have been omitted for simplicity):

RegisterNewProcess( )
RegisterDisplay( )
UpdateDisplay( )
HasConfigurationApplet( )
ConfigurationAppletSize( )
GetConfigurationApplet( )
HasControlApplet( )
ControlAppletSize( )
GetControlApplet( )
HasDiagnoseApplet( )
DiagnoseAppletSize( )
GetDiagnoseApplet( )
HasStatusApplet( )
StatusAppletSize( )
GetStatusApplet( )

Suitable workstations for use with the present invention include any Intel x86/Windows NT® or Unix-based platforms, such as the Ultra series of workstations from Sun Microsystems, Inc. of Mountain View, Calif. and/or the HP Visualize workstations from Hewlett-Packard Co.

Configuration service layers 302, 308 and 316 preferably comprise programmed or programmable processing elements containing software programs, such as software modules or libraries, pertaining to the methods and functions described herein, and executable by the processing elements.

Other computer readable media may also be used to store and execute the program instructions. Configuration service layers 302, 308 and 316 may also be implemented in hardware through a plurality of registers and combinational logic configured to produce sequential logic circuits and cooperating state machines. Those skilled in the art will recognize that various combinations of hardware and software components may also be utilized to implement the present invention.

In a preferred embodiment, the invention described herein, including the configuration service layers 302, 308 and 316, are implemented in an object-oriented programming (OOP) language, such as Java or C++. Nonetheless, those skilled in the art will recognize that other OOP languages may be utilized. Java and C++ are well-known and many articles and texts are available which describe the languages in detail. In addition, Java and C++ interpreters and compilers are commercially available from several vendors. Accordingly, for reasons of clarity, the details of the Java and C++ languages and the operations of their interpreters and compilers will not be discussed further in detail herein.

As will be understood by those skilled in the art, OOP techniques involve the definition, creation, use and destruction of "objects". These objects are software entities comprising data elements and routines, or functions, which manipulate the data elements. The data and related functions are treated by the software as an entity that can be created, used and deleted as if it were a single item. Together, the data and functions enable objects to model virtually any real-world entity in terms of its characteristics, which can be represented by the data elements, and its behavior, which can be represented by its data manipulation functions. In this way, objects can model concrete things like computers, while also modeling abstract concepts like numbers or geometrical designs.

Objects are defined by creating "classes" which are not objects themselves, but which act as templates that instruct the compiler how to construct an actual object. A class may, for example, specify the number and type of data variables and the steps involved in the functions which manipulate the data. An object is actually created in the program by means of a special function called a "constructor" which uses the corresponding class definition and additional information, such as arguments provided during object creation, to construct the object. Likewise objects are destroyed by a special function called a "destructor". Objects may be used by manipulating their data and invoking their functions.

The principle benefits of OOP techniques arise out of three basic principles: encapsulation, polymorphism and inheritance. Specifically, objects can be designed to hide, or encapsulate, all, or a portion of, its internal data structure and internal functions. More specifically, during program design, a program developer can define objects in which all or some of the data variables and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions that have the same overall format but that work with different data, to function differently in order to produce consistent results. Inheritance, on the other hand, allows program developers to easily reuse pre-existing programs and to avoid creating software from scratch. The principle of inheritance allows a software developer to declare classes (and the objects which are later created from them) as related. Specifically, classes may be designated as sub-classes of other base classes. A subclass "inherits" and has access to all of the public functions of its base classes just as if these functions appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs.

In order to pass service requests among various network components and to support the distribution of objects as provided in the present invention, the configuration service layers 302, 308, 316 are preferably implemented in accordance with the Common Object Request Broker Architecture (CORBA) from the Object Management Group (OMG), as described in Revision 2.2 of the CORBA Architecture and Specification from OMG, which is hereby incorporated by reference in its entirety. CORBA is basically a communications facility or architecture that allows applications or processes (i.e., clients) to request services of distributed objects (i.e., servers). With CORBA, clients need not know the network locations of the objects configured to execute their service requests or the programming language in which those objects are written. These issues, among others, are resolved by CORBA, which is typically implemented at each client through an Object Request Broker (ORB). The ORB, moreover, provides one or more interfaces, defined in a language called Interface Definition Language (IDL), to its client or server applications and processes. That is, the client applications or processes communicate with the servers using the predefined IDL.

In order to communicate with ORBs located at other components within a network, CORBA also implements the General Inter-ORB Protocol (GIOP). GIOP basically provides the ORB with a mapping to one or more transport layer protocols implemented within the network. One of the more established GIOP mappings is the Internet Inter-ORB Protocol (IIOP), which utilizes the Transmission Control Protocol (TCP) of the TCP/IP Reference Model for internetwork communication. Other GIOP mappings are available for IBM's Systems Network Architecture (SNA) and Novell's IPX protocol stacks. In a preferred embodiment, the configuration service layers 302, 308 and 316 preferably implement IIOP.

It should be understood that, rather than utilizing the CORBA standards to perform distributed object manipulation, the configuration service layers 302, 308 and 316 may utilize the Distributed Component Object Model (DCOM) from Microsoft Corp. of Redmond, Wash., or the Remote Method Invocation (RMI) developed by Sun Microsystems, Inc. for use with Java.

Dynamic Reporting of New Applications and Processes

In accordance with the present invention, instances of distributed applications or processes that are added to network 200 are preferably configured to include, as part of their executable code, a software module or library that directs them to register with the process server application 230, upon opening or initialization. Suppose, for example, that a new application or process, such as new management process 242 (FIG. 3A), is added to the network 200 (FIG. 2). That is, suppose a network administrator installs and runs the new management process 242 at workstation 220. Process 242 first defines an object interface utilizing a corresponding CORBA IDL language. An example of such an interface, which includes the methods that may be implemented by the respective object, is as follows.

```
interface Action {
    HasConfigurationApplet( )
    ConfigurationAppletSize( )
    GetConfigurationApplet( )
    HasControlApplet( )
    ControlAppletSize( )
    GetControlApplet( )
    HasDiagnoseApplet( )
    DiagnoseAppletSize( )
    GetDiagnoseApplet( )
    HasStatusApplet( )
    StatusAppletSize( )
    GetStatusApplet( )
};
```

New management process 242 then creates an instance of the ProcessAction object using a constructor such as "ProcessActionImplementation processaction=new ProcessActionImplementation( )".

In a similar manner, the process manager application 230 defines a corresponding object interface utilizing a CORBA IDL language. This object interface may be defined as follows.

```
interface ProcessManager {
    RegisterNewProcess(Action actioninterface,
        string process_name,
        string hostname
        Status status);
};
```

The process manager application 230 also creates an instance of the ProcessManager object using a constructor such as "ProcessManagerImplementation processmanager=new ProcessManagerImplementation( )".

Next, new management process 242 binds to the process manager application 230, using a call or command such as "ProcessManager processmanager=ProcessManagerHelper.bind("ProcessManager"). As shown, process 242 preferably identifies the process manager application 230 in the bind command by means of a well-known name (e.g., "Process Manager"). The use of a well-known name simplifies the programming of the software module or library of new management process 242. That is, program developers can simply rely on the well-known name, rather than having to know an implementation specific name or IP address for the process manager 230. Configuration service layer 302 preferably relies on a conventional CORBA locator service to "find" the process manager application 230 based on its well-known name. Alternatively, configuration service layer 302 may be manually configured with the IP address and TCP or User Datagram Protocol (UDP) port number for the process manager application 230 or it may retrieve this information from one or more designated servers. Once the process manager application 230 is found, the IIOP protocol is used to generate an Interoperable Object Reference (IOR), which the configuration service layer 302 may use to reach the process manager 230. An IOR basically contains all of the information (e.g., IP addresses, port numbers, etc.) needed to route messages, such as service requests, to distributed objects.

Once the ProcessAction object has been defined and constructed and the binding to the process manager application 230 has been established, new management process 242 issues an ObjectIsReady(processaction) command or call to its respective configuration service layer 302. Configuration service layer 302, in response, up-dates its tables in a conventional manner so that requests for services by the ProcessAction object will be passed to this object instance. Configuration service layer 302 also establishes and exchanges with the process manager application 230 an IOR for this object.

Next, new management process 242, in cooperation with its associated configuration service layer 302, issues a RegisterNewProcess( ) service request to the process manager application 230 entering its callback routine (i.e., processaction), its name, its status (e.g., up, down, started, not started, etc.) and the name of workstation 220 (e.g., by IP address, host name, etc.) as arguments. Configuration service layer 302 passes the RegisterNewProcess( ) service request from process 242 to the process manager application 230 at workstation 228. More specifically, the configuration service layer 302 at workstation 220 marshals the service request into a canonical format, and, using IIOP protocol and the IOR, hands the marshaled service request down to its corresponding network communication facility 304 for transmission. Communication facility 304, in turn, encapsulates the service request in one or more data packets and transmits them to workstation 228 via network communication medium 306. At workstation 228, the network communication facility 310, captures these data packets and decapsulates them to recover the RegisterNewProcess( ) service request, which is passed up to the configuration service layer 308. Layer 308, in turn, provides the service request to the process manager application 230. In response to the RegisterNewProcess( ) service request from new process 242, the process manager application 230 preferably generates a record identifying the new process 242, the workstation 220 at which it is running, and its callback. The process manager application also alerts at least one user interface application, such as application 242 (FIG. 3B) at workstation 224, of the opening of new process 242.

In order to receive notifications, the user interface applications 246, 248 also register with the process manager application 230. In particular, as part of their initialization, the user interface applications 246, 248 preferably bind to the process manager application 230, in a similar manner as described above, and issue corresponding Register-Display( ) service requests so as to register with their callback routines with the process manager application 230. As part of the registration, applications 246 and 248 may specify the particular information that they are interested in receiving. Upon receiving the RegisterNewProcess( ) service request from the new management process 242, the process manager application 230 issues an UpdateDisplay( ) service request to one or more user interface applications, such as application 246. Process manager application 230 inserts the information received from new management process 242 as arguments to the UpdateDisplay( ) service request, which is then marshaled and transmitted to user interface application 246. Application 246 receives the UpdateDisplay( ) service request and automatically adds the name of the new management process 242 and the other information contained in that request to a list of applications and processes displayed on screen 314.

Figure 4:
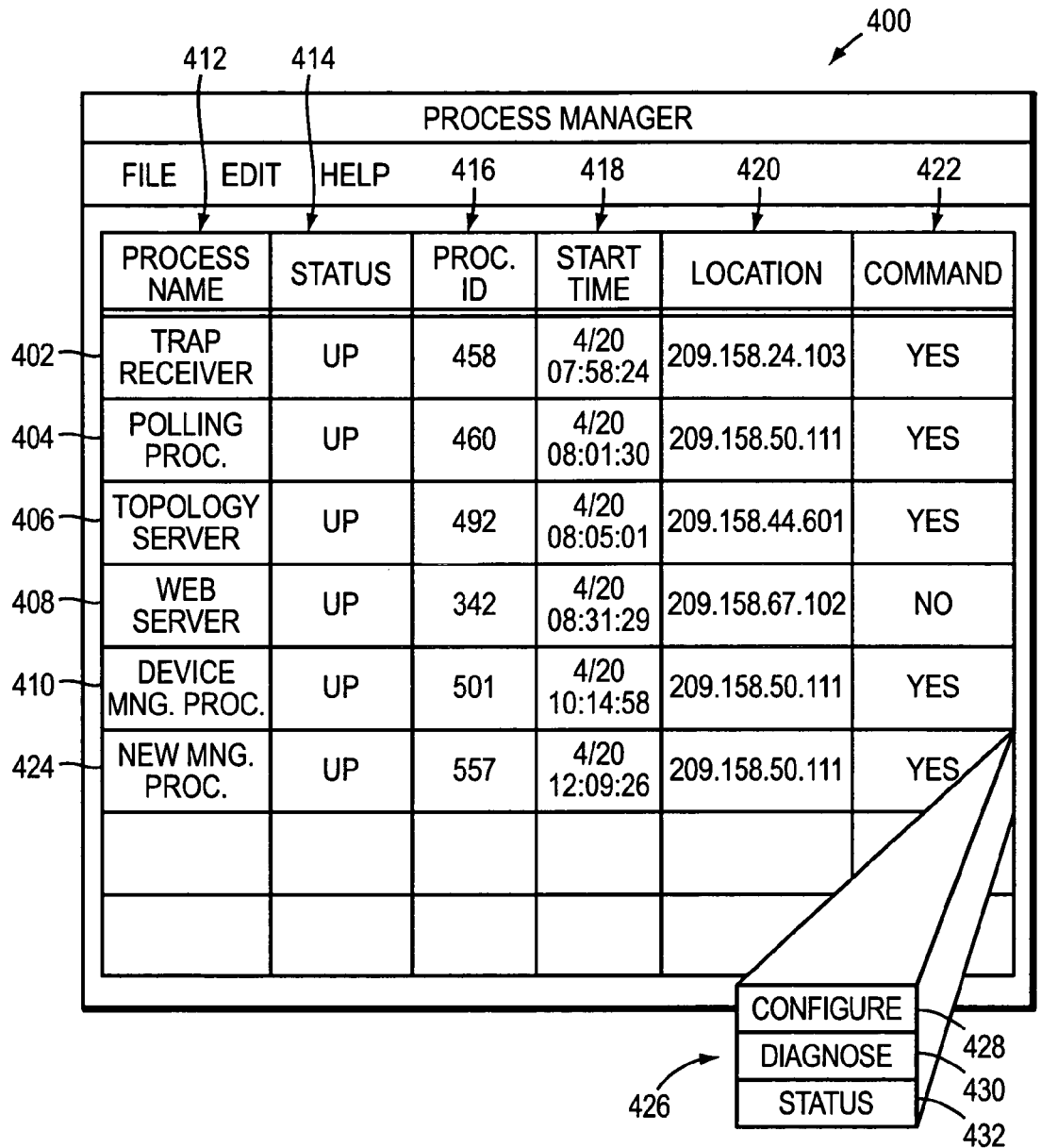
FIGS. 4–6 are representations of displays of windows and references in accordance with the present invention.

FIG. 4 is a representative display of a Process Manager window 400 listing the applications and processes running in computer network 200 and their status. User interface application 246 (FIG. 3B) is preferably configured to generate the Process Manager window 400 on screen 314 (FIG. 3B) upon start-up, using the Java Programming Language, which supports dynamic up-dates. Each application or process included within window 400 is preferably represented by a different line or row, and the rows are stacked on top of each other to form a table or array. For example, a first line 402 of window 400 identifies a trap receiver process, a second line 404 identifies the polling process 238 (FIG. 3A), a third line 406 identifies the topology server 218 (FIG. 2), a fourth line 408 identifies a web server, and a fifth line 410 identifies the device management process 240 (FIG. 3A). Each line or row, moreover, includes information associated with its respective process that is arranged as columns of the window 400. A first column 412, for example, specifies the name of the process, a second column 414 specifies the status of the process (e.g., up, down, started, not started, unknown, etc.), a third column 416 specifies a processor identifier (ID), which is a conventional identifier that may be assigned by the respective operation system (such as Unix), a fourth column 418 specifies the time that the respective process was started, a fifth column 420 may be used to specify the location of the process (e.g., by IP address of the workstation at which the process is running), and a sixth column 422 (Command) specifies whether the respective application or process supports dynamic modification, as described below.

Upon receiving the UpdateDisplay( ) service request from process manager application 230 (FIG. 3A) regarding the opening of new management process 242, the user interface application 246 automatically adds a new line or row 424 to window 400 corresponding to the new process 242. Since window 400 is generated with the Java Programming Language, the receipt of new information may be automatically added to and displayed by window 400 without having to recycle (e.g., close and re-open) user interface application 246. By simply watching the list of applications and processes contained in window 400, a network administrator is automatically notified of the addition of new management process 242 to the network 200. It should be understood that the user interface application 246 may employ conventional techniques, such as flashing graphics, sounds, modal windows, etc., to alert the network administrator regarding the existence of a new application or process.

Before displaying the new row 424, the user interface application 246 preferably determines whether process 242 supports dynamic modification. In particular, user interface application 246 issues a HasConfigurationApplet( ), HasControlApplet( ), HasDiagnoseApplet( ) and HasStatusApplet( ) service requests to the new management process 242 in response to the UpdateDisplay( ) service request. These service requests are used to determine whether process 242 supports any one or more of these functions. Process 242 preferably returns each of these Has( ) service requests with a Boolean true or false, indicating whether it supports the respective function. For example, if process 242 supports configuration, diagnose and status, but not control, it returns a Boolean true in the HasConfigurationApplet( ), HasDiagnoseApplet( ) and HasStatusApplet( ) service requests, and a Boolean false in the HasControlApplet( ) service request. In response to receiving one or more of the Has( ) service requests that are true, user interface application 242 preferably enters a "Yes" in the respective command field 422.

Dynamic Reporting of New Devices

Network administrators are also automatically notified of the addition of new devices to the network 200. More specifically, the presence of a new device, such as new device 214 (FIG. 3A), is preferably detected by discovery application 236 running at topology server 218 in a conventional manner. In a preferred embodiment, discovery application 236 participates in a conventional CORBA notification service as a notification producer, and the user interface application 248 participates as a notification consumer. More specifically, user interface application 248 registers with the topology server 218, which includes a network communication facility and a configuration service layer, using the RegisterDisplay( ) request method. As part of its registration, application 248 identifies the particular information or information type that it is interested in receiving (e.g., the discovery of new devices). Upon detecting new device 214, the discovery application 236 issues an UpdateDisplay( ) service request to user interface application 248 notifying it of the new device 214 and providing a reference to device management process 240 which is responsible for managing device 214. The UpdateDisplay( ) service request is received at user interface application 248, which, in response, adds the name of the new device 214 and its network location to a list of devices displayed by in a window presented on a display screen at workstation 226.

Figure 5:
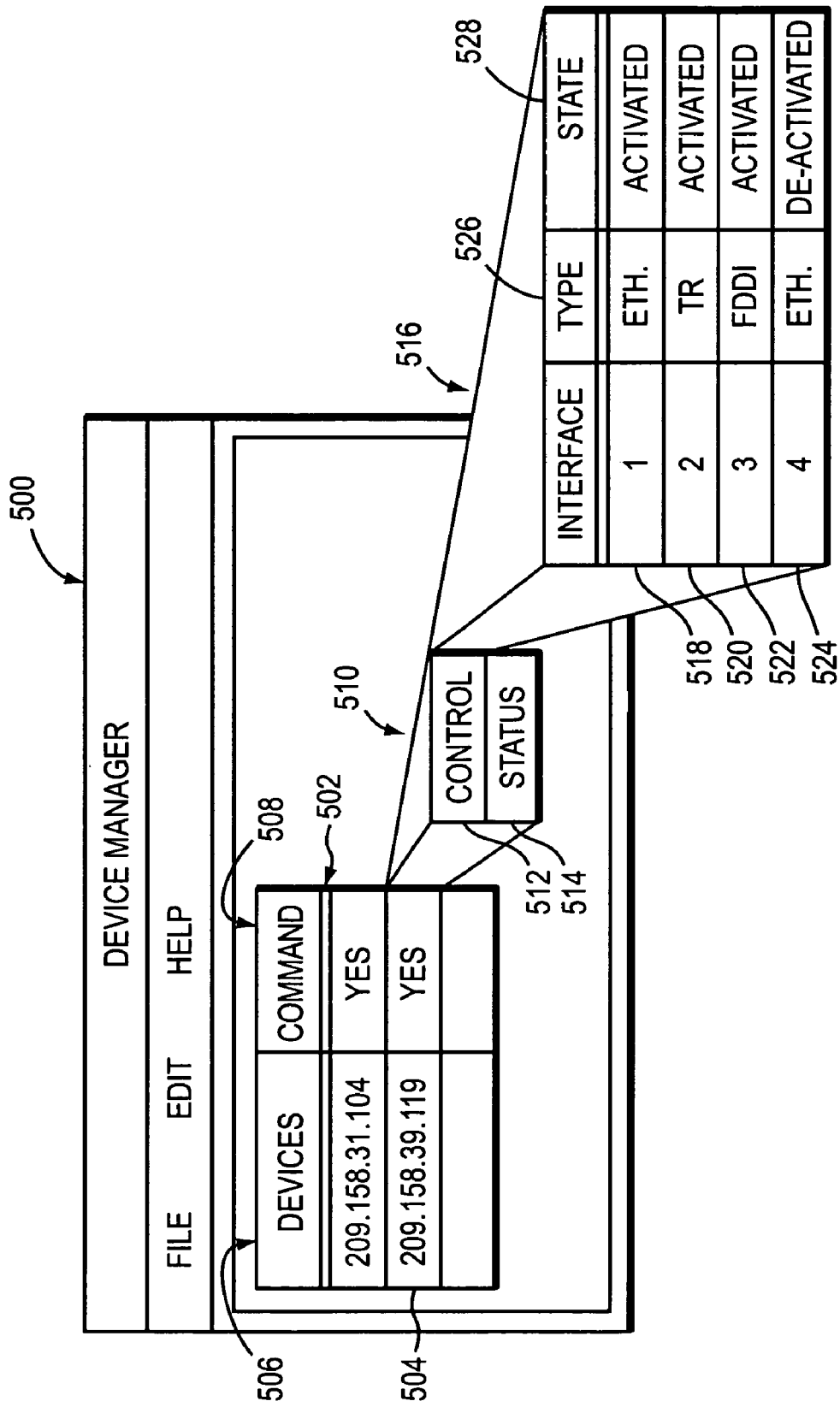

FIG. 5 is a highly schematic display of a window 500 for use in displaying the devices located within network 200 (FIG. 2). In particular, window 500, which may be displayed by user interface application 248 on a display screen (not shown) at workstation 226, includes a list 502 of the devices within network 200. List 502 includes a plurality of rows each of which is associated with a corresponding device. Upon receiving the UpdateDisplay( ) service request, the user interface application 248 automatically adds a new row 504 to list 502 corresponding to the newly discovered device 214. Each row may include an identification field 506 containing the identification of the respective device (e.g., by IP address, name, etc.) and a command field 508 indicating whether the respective device may be dynamically modified in accordance with the present invention. Application 248 determines whether the respective devices support dynamic modification through the exchange of the Has( ) service requests as described above. By monitoring the list of devices 602, a network administrator at workstation 226 is automatically notified of the addition of new devices, such as new device 214, to the network 200.

Interactive Modification to Configuration, Control, Diagnose and Status Parameters In a further aspect of the invention, network administrators may dynamically modify selected configuration, control, diagnose, status or other parameters associated with network components or perform other operations on new or existing applications or processes or devices within network 200. Suppose, for example, that a network administrator, upon learning of the existence of new management process 242 at workstation 220, wishes to configure that process to acquire information from device 212. The network administrator, acting through user interface application 246 (FIG. 3B) selects the new management process 242 from line 424 (FIG. 4) of window 400. In response, the user interface application causes a modal window 426 to be displayed that shows the various configure, control, diagnose, status other options (e.g., debug) that may be dynamically performed on the selected application or process (i.e., process 242). As shown, modal window 426 includes a configure button 428, a diagnose button 430 and a status button 432, indicating that the network administrator may modify or view the configuration, diagnostic or status parameters of process 424.

To alter selected configuration parameters associated with process 242, the network manager preferably selects the configure button 428. In response, the user interface application 246 issues a ConfigurationAppletSize( ) service request and a GetConfigurationApplet( ) service request to process 242. Configuration service layers 316 and 302 at workstations 224 and 220, respectively, handle the transfer of these service requests from user interface application 246 to new management process 242. In response to the GetConfigurationApplet( ) service request, new management application preferably instantiates a configuration object 320a (FIG. 3A). The configuration object 320a preferably includes variables relating the configuration parameters supported by process 242 and supports methods for acting upon (e.g., modifying) those variables. To instantiate the configuration object 320a, the programming code for process 242 preferably includes a constructor that is configured to create objects from a base "configuration" class. For example, process 242 may use a constructor called "public Configuration(string name)" where the name of the particular object (e.g., configuration) being created is inserted as an argument. Process 242 also creates a corresponding Java applet, that it initializes with a pointer to the configuration object 320a that it created. The process 242 preferably returns the ConfigurationAppletSize( ) service request to user interface application 246 with the widow size (e.g., width and height) of the corresponding Java applet so that it may be properly displayed by application 246.

Using the configuration service layers 302 and 316 at workstations 220, 224, respectively, process 242 passes the Java applet having the pointer to the configuration object 320a that it constructed to the user interface application 246. Process 242 preferably utilizes a conventional pass-by-value technique, such as the Java ObjectOutputStream.class, for converting the Java applet to a byte array and passing that byte array to application 246. The user interface application 246 uses the well-known Java ObjectInputStream.class to convert the byte array back to the Java applet. Upon recovering the Java applet having the pointer to object 320a, user interface application 246 creates a window having a size as specified in the returned ConfigurationAppletSize( ) service request and simply displays the recovered Java applet on its display screen 314, as illustrated by configuration applet 320b (FIG. 3B).

As the network administrator manipulates the configuration applet 320b by executing various actions (such as mouse or button clicks, keyboard presses, voice activation, etc.), the corresponding events are trapped by the applet 320b. To trap events, the Java applet 320b preferably initializes a plurality of conventional Java Action( ) methods from the Java Component class. These trapped events are then transmitted by the configuration applet 320b directly to the new management process 242 at workstation 220, which dynamically implements the changes or modifications reflected by the trapped events initiated by the network administrator.

The network administrator may also re-configure polling process 238 at workstation 220, which is already configured to poll devices 208 and 210, to begin polling new device 214. In particular, the network administrator selects line 404 (FIG. 4) of process manager window 400, which corresponds to the polling process 238 at workstation 220. In response to the selection of line 404, the user interface application 246 displays a modal window (not shown) listing the various configure, control, diagnose, status or other options that may be dynamically performed on the selected application or process (i.e., polling process 238). The network administrator preferably selects a configure button from this modal window.

In response to the selection of the control button, the user interface application 246 issues a GetConfigurationApplet( ) service request and a ConfigurationAppletSize( ) service request to polling process 238. The polling process 238, in turn, uses the "public Configure(string name)" constructor to construct or initialize a configure object 322a (FIG. 3A). Process 238 also creates a corresponding Java applet that it initializes with a pointer to the configure object 322a that it created, and returns the ConfigurationAppletSize( ) service request to user interface application 246 with the widow size (e.g., width and height) of this Java applet. Process 238 then transmits the Java applet having the pointer to configure object 322a to workstation 224 (FIG. 3B) where it is captured by user interface application 246 and displayed on display screen 314, as shown by configure applet 322b. Using an input device, the network administrator preferably modifies the list of devices polled by process 238 by adding device 214. Again, the changes are trapped by configure applet 322b and transmitted to polling process 238 where they are dynamically implemented. That is, polling process 238 dynamically up-dates its configuration data to include device 214 as one of the devices that it periodically polls.

Dynamically Configuring, Controlling, Debugging and Diagnosing Network Devices

In a further aspect of the present invention, a network administrator may also dynamically configure, control, debug and diagnose network devices. Suppose, for example, that a network administrator, upon learning of the addition of new device 214 to the network 200, wishes to set the control parameters for that device. As described above, the addition of new device 214 is automatically reported to the user interface application 248 at workstation 226 along with a reference to device management process 240, which manages device 214. The network administrator selects new device 214 from list 502 (FIG. 5), and, in response, a modal window 510 containing the various configure, control, debug, diagnose or other options that may be dynamically performed on the new device 214 is displayed, such as a control button 512 and a status button 514. The network administrator preferably selects the control button 512 from the modal window 510. In response, the user interface application 248 issues both a GetControlApplet( ) and a ControlAppletSize( ) service request to device management process 240.

The configuration service layers at workstations 226 and 220 handle the transfer of these service requests from user interface application 248 to device management process 240. In response to the GetControlApplet( ) service request, process 240 preferably constructs a control object 324 (FIG. 3A) in a similar manner as described above. The control object 324 preferably includes variables relating the control parameters associated with device 214 and supports methods for acting upon (e.g., modifying) those variables. Process 240 also creates a corresponding Java applet that is initialized with a pointer to control object 324. Using the respective configuration service layers at workstations 220 and 226, process 240 passes the Java applet having the reference to control object 324 to the user interface application 248. Upon receiving the Java applet initialized by process 240, user interface application 248 simply displays it on its display screen, as shown by Java applet 516 (FIG. 5). By manipulating the Java applet 516, the network manager may dynamically control the new device 214.

The Java applet 516, for example, may include a plurality of rows 518–524, each associated with a particular interface at new device 214. Each interface of rows 518–524, moreover, may include a type field 526 containing the data link type (e.g., Ethernet (Eth.), Token Ring (TR), Fiber Distributed Data Interface (FDDI), etc.) of the respective interface, and a state field 528 indicating whether the respective interface has been activated or de-activated. The network administrator, using the keyboard or mouse, may modify the state of any interface (e.g., changing an interface from the de-activated to the activated state).

As the network administrator manipulates the Java applet 516, the corresponding events are trapped and transmitted to process 240 at workstation 220, and process 240 dynamically implements these changes or modifications. For example, process 240, utilizing the well-known Simple Network Management Protocol (SNMP), may change the control settings of new device 214 as reflected by modifications made by the network administrator to modal window 606. In particular, process 240 issues one or more conventional SNMP messages effecting the changes requested by the network administrator. The SNMP messages are received and carried out by the new device 214 in a conventional manner. Significantly, user interface application 248 need not be closed and restarted in order for it to issue control messages for new device 214. Instead, the changes requested by the network administrator interacting with the Java applet 516 are dynamically implemented by process 240.

Figure 6:
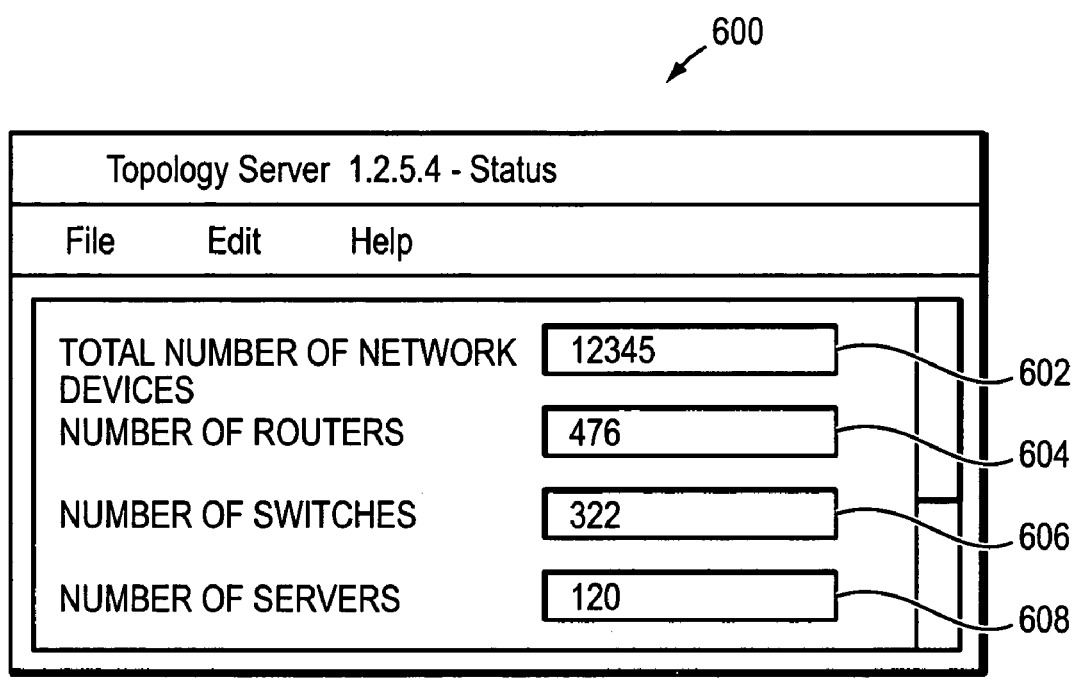

A network administrator may similarly modify or change diagnostic or debugging parameters for any application, process or device of network 200, or view corresponding status information. FIG. 6, for example, is a highly schematic display of a status window object 600 as generated and transmitted by the discovery application 236 (FIG. 2) of the topology server 218. Status window object 600 includes a first area 602 specifying the total number of network devices within network 200 as identified by topology server 218. Status window object 600 may contain additional information breaking down the data in first area 602. For example, status window object 600 may further include a second area 604 specifying the total number of routers, a third area 606 specifying the total number of switches and a fourth area 608 specifying the total number of servers within network 200. Those skilled in the art will recognize that a variety of other configuration, control, debug, diagnose and status objects may be constructed and displayed in accordance with the present invention.

The foregoing description has been directed to specific embodiments of the invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for use in a computer network having a process manager and a network management station for reporting to the network management station the addition of new applications or processes to the computer network, the method comprising the steps of:
   providing a configuration service layer in communicating relationship with a new application or process and the process manager;
   in response to opening the new application or process, issuing a registration service request from the new application or process to the process manager through the configuration service layer;
   persistently and continuously listening, at the network mamagement station, for messages from the process manager;
   in response to receiving the registration service request at the process manager, generating and forwarding a notification message that identifies the new application or process to the network management station;
   automatically displaying the notification message at the network management station without having to close and re-start the management station, and
   automatically and dynamically modifying the parameters associated with existing or with the new application or process.

2. The method of claim 1 further comprising the steps of:
   creating a process manager window at the network management station that displays a list of applications and processes opened in the computer network; and
   in response to receiving the notification message, adding the new application or process to the list of applications and processes displayed in the process manager window.

3. The method of claim 2 further comprising the step of displaying a status, a start time and a location of the new application or process, within the process manager window, based on information from the received notification message.

4. The method of claim 3 wherein the status includes one of up, down, started, not started, and unknown.

5. The method of claim 4 wherein the new application or process has parameters associated with at least one of configure, control, diagnose and status functions, the method further comprising the steps of:
   in response to selecting the new application or process from the process manager window, displaying at least one of configure, control, diagnose and status buttons associated with the new application or process; and
   in response to selecting one of the displayed configure, control, diagnose and status buttons, obtaining a respective configure, control, diagnose and status object from the new application or process; and
   displaying the obtained configure, control, diagnose and status object at the network management station.

6. The method of claim 1 wherein the step of modifying the respective parameters of the new application or process automatically and dynamically occurs in response to manipulations of a configure, control, diagnose and status object displayed at a network management station.

7. The method of claim 1 further comprising the steps of:
   detecting a new device added to the network; and
   upon detecting the new device, generating a second notification message; and
   passing the second notification message to the network management station.

8. The method of claim 7 further comprising the step of:
   in response to receiving the second notification message, displaying identification and configuration information associated with the new device at the network management station.

9. A computer workstation for use in a computer network having at least one process manager, the workstation comprising:
- at least one application or process;
- a network communication facility;
- a user interface application; and
- a configuration service layer in communicating relationship with the at least one application or process and the network communications facility,
- wherein the at least one application or process and the configuration service layer cooperate to generate and issue, through the network communication facility, a registration service request to the at least one process manager upon opening of the at least one application or process at the computer workstation, the registration service request containing information therein to identify the new application or process to the at least one process manager in response in response to receiving the registration service request, and thereby automatically and dynamically indicate the existence of the new application or process without having to close and restart the process manager.

10. A system for dynamically modifying the configuration, settings and other parameters associated with one or more applications or processes running in a computer network, the system comprising:
- means for registering with a process manager upon opening an application or process;
- means for generating a notification object upon the registration of an opened application or process, wherein the notification object contains a reference identifying the opened application or process;
- means for passing the notification object to one or more user interface applications; and
- means for presenting the notification object in one or more user interface applications without having to close and re-start the respective user interface application, and
- means for automatically and dynamically modifying parameters associated with the opened application or process.

11. A system as defined in claim 10 wherein each user interface application contains one or more windows, the system further comprising:
- means for displaying the notification object in one or more windows contained in one or more user interface applications.

12. A system as defined in claim 10 further comprising:
- means for creating a process manager window that displays a list of applications and processes opened in the computer network; and
- means for adding an application or process to the list of applications and processes displayed in the process manager window in response to receiving the notification object.

13. A system as defined in claim 12 comprising:
- means for displaying at least one of configure, control, diagnose and status buttons associated with an application or process in response to selecting the application or process from the process manager window;
- means for obtaining a respective configure, control, diagnose and status object from the new application or process in response to selecting one of the displayed configure, control, diagnose and status buttons; and
- means for displaying the obtained configure, control, diagnose and status object.

14. A system as defined in claim 10 comprising:
- means for detecting a new device added to the network; and
- means for issuing a service request to a user application interface upon detecting the new device, wherein the service request contains a name identifying the new device.

15. A system as defined in claim 14 further comprising:
- means for receiving the service request at a user application; and
- means for adding the name identifying the new device to a list of devices displayed in a window presented on a display screen of a workstation.

16. A method for operating a workstation, comprising:
- executing a management software on the workstation;
- receiving a registration service request by the workstation from a server computer, the registration service request indicating that a new application has been added to the server computer to execute on the server computer;
- generating a configuration object related to the new application;
- receiving a remotely provided applet specific to the new application, the remotely provided applet referencing the configuration object and including controls for modifying parameters of the new application; and
- displaying the applet in a user interface of the management software, the user interface configured to pass parameter modifications made with the applet to the new application, to dynamically change the parameters of the new application.

17. The method as in claim 16, further comprising:
- receiving the registration service request over a computer network from the server computer.

18. The method as in claim 16, further comprising:
- automatically displaying, in response to receiving the registration service request, an indication that the new application process is executing on the server computer without having to close and restart the management software.

19. A computer workstation, comprising:
- means for executing a management software on the workstation;
- means for receiving a registration service request by the workstation from a server computer, the registration service request indicating that a new application has been added to the server computer to execute on the server computer;
- means for generating a configuration object related to the new application;
- means for receiving a remotely provided applet specific to the new application, the remotely provided applet referencing the configuration object and including controls for modifying parameters of the new application; and
- means for displaying the applet in a user interface of the management software, the means for displaying configured to pass parameter modifications made with the applet to the new application, to dynamically change the parameters of the new application.

20. The workstation as in claim 19, further comprising:
- means for receiving the registration service request over a computer network from the server computer.

21. The workstation as in claim 19, further comprising:
- means for automatically displaying, in response to receiving the registration service request, an indication that the new application process is executing on the server computer without having to close and re-start the management software.

22. A computer workstation, comprising:
a management software executing on the workstation;
a network communication facility configured to receive a registration service request from a server computer, the registration service request transmitted to indicate that a new application has been added to the server computer to execute on the server computer, the network communication facility further configured to generate a control object related to the new application and to receive a remotely provided applet specific to the new application, the remotely provided applet referencing the control object and including controls for modifying parameters of the new application;
wherein the management software is further configured to display the applet and configured to pass parameter modifications made with the applet to the new application, to dynamically change the parameters of the new application.

23. The workstation as in claim 22, further comprising:
the network communications facility to receive the registration service request over a computer network from the server computer.

24. The workstation as in claim 22, further comprising:
the management software configured to automatically display, in response to receiving the registration service request, an indication that the new application process is executing on the server computer without having to close and re-start the management software.

25. A computer readable media, comprising:
said computer readable media having instructions written thereon for execution on a processor for, receiving a registration service request by the workstation from a server computer, the registration service request indicating that a new application has been added to the server computer to execute on the server computer;
generating a configuration object related to the new application;
receiving a remotely provided applet specific to the new application, the remotely provided applet referencing the configuration object and including controls for modifying parameters of the new application; and
displaying the applet in a user interface of the management software, the user interface configured to pass parameter modifications made with the applet to the new application, to dynamically change the parameters of the new application.

26. A computer workstation for use in configuring one or more devices in a computer network, the computer workstation comprising:
a user interface application configured to display a listing of the one or more devices, the listing of the one or more devices automatically updated in response to addition of devices to the computer network, absent re-start of the user interface application, the user interface application to permit selection of a particular device; and
a configuration service layer configured to, in response to selection of the particular device, generate a control object related to the particular device, the configuration service layer further configured to receive a remotely provided applet specific to the particular device, the remotely provided applet referencing the control object and including controls for modifying parameters of the device,
wherein the user interface application is further configured to display the applet and pass parameter modifications made with the applet to the device, to dynamically change the parameters of the device.

27. The computer workstation of claim 26, wherein the user interface application is configured to be automatically updated with notifications provided by a topology server.

28. The computer workstation of claim 27, wherein the user interface application is configured to be automatically updated by Common Object Request Broker Architecture (CORBA) notifications.

29. The computer workstation of claim 26, wherein the listing comprises a plurality of portions, each portion corresponding to one of the one or more devices, each portion including an identification field that identifies the device and a configuration field that indicates that parameters of the device may be dynamically modified.

30. The computer workstation of claim 26, wherein the applet is provided by a device management process of a remote workstation.

31. The computer workstation of claim 26, wherein the applet is configured to indicate the state of a plurality of interfaces of the device, and to permit modification of the state of each interface, to active or deactivate each interface.

32. The computer workstation of claim 26, wherein parameter modifications are passed to the device as Simple Network Management Protocol (SNMP) messages.

33. The computer workstation of claim 26, wherein each portion further includes a command field that indicates that parameters of the application may be dynamically modified.

34. A computer workstation for use in configuring one or more applications executing on servers in a computer network, the computer workstation comprising:
a user interface application configured to display a listing of the one or more applications, the listing of the one or more applications configured to be automatically updated in response to execution of new applications on the servers, absent re-start of the user interface application, the user interface application to permit selection of a particular application; and
a configuration service layer configured to, in response to selection of the particular application, generate a configuration object related to the particular application, the
configuration service layer further configured to receive a remotely provided applet specific to the particular application, the remotely provided applet referencing the configuration object and including controls for modifying parameters of the application,
wherein the user interface application is further configured to display the applet and pass parameter modifications made with the applet to the application, to dynamically is change the parameters of the application.

35. The computer workstation of claim 34, wherein the user interface application is configured to be automatically updated with notifications provided by the one or more applications.

36. The computer workstation of claim 35, wherein the user interface application is configured to be automatically updated by Common Object Request Broker Architecture. (CORBA) notifications.

37. The computer workstation of claim 34, wherein the listing comprises a plurality of portions, each portion corresponding to one of the one or more applications, each portion including an application name field, an application status field, and an application location field.

38. The computer workstation of claim 34, wherein parameter modifications are passed to the application as Simple Network Management Protocol (SNMP) messages.

39. The computer workstation of claim 34, wherein the applet is provided by the server executing the particular application.

40. A method for configuring one or more devices in a computer network, the method comprising the steps of:
  displaying a listing of the one or more devices;
  updating automatically the listing of the one or more devices in response to addition of devices to the computer network;
  selecting a particular device of the one or more devices;
  in response to selection of the particular device, generating a control object related to the particular device;
  receiving a remotely provided applet specific to the particular device, the remotely provided applet referencing the control object and including controls for modifying parameters of the device; and
  displaying the applet and passing parameter modifications made with the applet to the device, to dynamically change the parameters of the device.

41. The method of claim 40, wherein the step of updating is performed in response to receiving notifications from a topology server.

42. The method of claim 40, further comprising the steps of:
  indicating the state of a plurality of interfaces of the device; and
  permitting modification of the state of each interface to active or deactivate each interface.

43. The method of claim 40, wherein the applet is provided by a device management process of a remote workstation.

44. A method for configuring one or more applications executing on servers in a computer network, the method comprising the steps of:
  displaying a listing of the one or more applications;
  updating automatically the listing of the one or more applications in response to execution of new applications on the servers;
  selecting a particular application of the one or more applications;
  in response to selection of the particular application, generating a configuration object related to the particular application;
  receiving a remotely provided applet specific to the particular application, the remotely provided applet referencing the control object and including controls for modifying parameters of the application; and
  displaying the applet and passing parameter modifications made with the applet to the application, to dynamically change the parameters of the application.

45. The method of claim 44, wherein the step of updating is performed in response to receiving notifications from the one or more applications.

46. The method of claim 44, wherein the applet is provided by the server executing the particular application.

47. A computer readable medium containing executable program instructions for configuring one or more devices in a computer network, the executable program instructions comprising program instructions for:
  displaying a listing of the one or more devices;
  updating automatically the listing of the one or more devices in response to addition of devices to the computer network,
  selecting a particular device of the one or more devices;
  in response to selection of the particular device, generating a control object related to the particular device;
  receiving a remotely provided applet specific to the particular device, the remotely provided applet referencing the control object and including controls for modifying parameters of the device; and
  displaying the applet and passing through parameter modifications made with the applet to the device, to dynamically change the parameters of the device.

48. The computer readable medium of claim 47, wherein the executable program instructions for updating further comprising program instructions for:
  receiving notifications from a topology server.

49. A computer readable medium containing executable program instructions for configuring one or more applications executing on servers in a computer network, the executable program instructions comprising program instructions for:
  displaying a listing of the one or more applications;
  updating automatically the listing of the one or more applications in response to execution of new applications on the servers;
  selecting a particular application of the one or more applications;
  in response to selection of the particular application, generating a configuration object related to the particular application;
  receiving a remotely provided applet specific to the particular application, the remotely provided applet referencing the configuration object and including controls for modifying parameters of the application; and
  displaying the applet and passing through parameter modifications made with the applet to the application, to dynamically change the parameters of the application.

50. The computer readable medium of claim 49, wherein the executable program instructions for updating further comprising program instructions for:
  receiving notifications from the one or more applications.

* * * * *